United States Patent
Hughes

(10) Patent No.: US 11,448,793 B2
(45) Date of Patent: *Sep. 20, 2022

(54) METHOD AND APPARATUS FOR LOCATING NON-VISIBLE OBJECTS

(71) Applicant: AVX Electronics Technology Limited, Surrey (GB)

(72) Inventor: Richard David Hughes, Laindon (GB)

(73) Assignee: ZB3 Technologies Ltd, Essex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/446,761

(22) Filed: Jun. 20, 2019

(65) Prior Publication Data

US 2019/0302305 A1 Oct. 3, 2019

Related U.S. Application Data

(60) Continuation of application No. 15/911,646, filed on Mar. 5, 2018, now Pat. No. 10,353,105, which is a (Continued)

(30) Foreign Application Priority Data

Aug. 19, 2002 (GB) ...................................... 0219316

(51) Int. Cl.
*G01V 5/14* (2006.01)
*G01V 3/15* (2006.01)
(Continued)

(52) U.S. Cl.
CPC ................ *G01V 3/15* (2013.01); *B21J 15/28* (2013.01); *B21J 15/44* (2013.01); *B23B 49/00* (2013.01);
(Continued)

(58) Field of Classification Search
CPC ............................ G01D 5/145; G01D 11/245
See application file for complete search history.

(56) References Cited

U.S. PATENT DOCUMENTS

| | | |
|---|---|---|
| 1,971,189 A | 8/1934 | Leibing |
| 2,785,592 A | 3/1957 | Caples et al. |
| 5,383,751 A | 1/1995 | Wheetley et al. |
| 5,434,500 A | 7/1995 | Hauck et al. |

(Continued)

FOREIGN PATENT DOCUMENTS

| | | |
|---|---|---|
| DE | 4404413 | 1/1995 |
| EP | 1132164 | 9/2001 |

(Continued)

*Primary Examiner* — Reena Aurora
(74) *Attorney, Agent, or Firm* — Dority & Manning, P.A.

(57) ABSTRACT

Non-visible objects which differ in their physical properties from their surroundings by association with a variable strength magnetic field may be detected by a suitable array of sensors which can be moved relative to the object in question. By analyzing the signals from the plurality of the sensors in the array, the position of the object can be deduced relative to the array and the array moved to enable a machining guide thereon to be aligned with the non-visible object. The system is of particular value in locating apertures in wing spars when attempting to fix the skin of the wing on to them where it is important to be able to locate the correct point at which to drill a hole through the skin to coincide with the hole in the spar. By defining a magnetic field in the vicinity of the hole to identify the hole magnetically and using an array of magnetic field sensors in a base with an aperture, it is possible to shift the array so that the aperture is precisely aligned with the non-visible hole.

14 Claims, 6 Drawing Sheets

Related U.S. Application Data continuation of application No. 15/095,756, filed on Apr. 11, 2016, now Pat. No. 9,910,179, which is a division of application No. 11/831,766, filed on Jul. 31, 2007, now Pat. No. 9,453,934, which is a continuation-in-part of application No. 10/525,129.

(51) Int. Cl.

| | | |
|---|---|---|
| *G01V 3/08* | (2006.01) | |
| *B21J 15/28* | (2006.01) | |
| *B21J 15/44* | (2006.01) | |
| *G01D 5/14* | (2006.01) | |
| *B23B 49/00* | (2006.01) | |

(52) U.S. Cl.
CPC ............... *G01D 5/145* (2013.01); *G01V 3/08* (2013.01); *G01V 3/081* (2013.01); *B23B 2215/04* (2013.01); *B23B 2260/128* (2013.01)

(56) References Cited

U.S. PATENT DOCUMENTS

| | | | |
|---|---|---|---|
| 5,773,971 A | 6/1998 | Tavernetti et al. | |
| 5,917,314 A | 6/1999 | Heger et al. | |
| 6,137,281 A | 10/2000 | Phillips et al. | |
| 9,551,628 B2* | 1/2017 | Lazic | B23Q 17/20 |
| 9,910,179 B2 | 3/2018 | Hughes | |
| 10,353,105 B2* | 7/2019 | Hughes | G01V 3/081 |
| 2002/0050043 A1 | 5/2002 | Sarh et al. | |
| 2003/0212489 A1 | 11/2003 | Georgeson et al. | |

FOREIGN PATENT DOCUMENTS

| | | |
|---|---|---|
| GB | 2299772 | 10/1996 |
| JP | 9257405 | 10/1997 |
| JP | H1039040 | 2/1998 |
| WO | WO 88/06298 | 8/1988 |
| WO | WO 95/24660 | 9/1995 |
| WO | WO 88/02852 | 4/1998 |
| WO | WO0206003 | 1/2002 |
| WO | WO 03/095154 | 11/2003 |

* cited by examiner

METHOD AND APPARATUS FOR LOCATING NON-VISIBLE OBJECTS

CROSS-REFERENCE TO RELATED APPLICATIONS

The present application is a continuation application of U.S. patent application Ser. No. 15/911,646 filed Mar. 5, 2018, which is a continuation application of U.S. patent application Ser. No. 15/095,756 filed Apr. 11, 2016, which is a divisional application of U.S. patent application Ser. No. 11/831,766 filed Jul. 31, 2007, which is a continuation-in-part of U.S. patent application Ser. No. 10/525,129 filed Jun. 9, 2005, which is a U.S. national stage application of International Application Serial No. PCT/GB2003/003624 filed Aug. 19, 2003, which claims priority to United Kingdom Patent Application No. 0219316.7 filed Aug. 19, 2002, the contents of each of which are hereby incorporated by reference.

BACKGROUND

This invention relates to locating non-visible objects, particularly though not exclusively for the purpose of identifying the position of a non-visible object prior to carrying out a mechanical processing step in the vicinity of the object so located.

There are many situations where it is desired to locate something accurately, although the item in question is not visible. A simple example is to locate the position of a load-bearing member in a partition wall made of a wooden frame to either side of which sheets of plasterboard are attached. If it is desired to fix something to the wall, e.g. using a hook, it is necessary to ensure that the hook, e.g. screwed into the wall, goes into part of the timber support rather than into the plasterboard, from which it will be easily removed when a load is applied because plasterboard is not particularly strong. Conventional methods, such as tapping the wall with a knuckle to determine the location of the supporting wooden frame members do not give particularly accurate results and require skill. Making a pilot hole through the plasterboard and inserting a piece of bent wire through it into the cavity likewise is not easy to carry out simply, and although location, e.g. using a small magnet, of the usually iron nails which hold the plasterboard to the wooden structure can be employed, again the results tend to be rather inaccurate, although this last approach does have the advantage of avoiding trying to insert a hook where there is already a nail underneath. U.S. Pat. No. 5,917,314 discloses a capacitive sensing system for finding wall studs, while U.S. Pat. No. 5,434,500 describes a system for marking a position on a partition precisely opposite a selected position on the other side against which a magnetic field generator is held.

These systems are useful in the building trades, but are not adapted for use in situations where dimensions are subject to tight tolerance limits, some of which are particularly critical in manufacture. For example, in the manufacture of aircraft, a widely used technique is the application of a metal plate or skin to an underlying frame, for example made of ribs or spars. In order to ensure a firm connection between the skin and the rib or spar, a technique commonly employed is that of fastening the two together, e.g. with a rivet or special fastener. In order to do this, apertures in the skin and the rib or spar need to coincide and this coincidence needs to be particularly accurate since if there is inaccuracy, riveting may be rendered more difficult, or even impossible and inadequately-fitting or mis-applied rivets can become loosened when the aircraft is in service leading to potentially catastrophic failure. Accordingly, the requirements for accurate matching of the hole in the skin with the hole in the rib or spar are very stringent and the penalty for inadequate accuracy may well be the failure of the finished assembly to meet the required rigorous safety standards, leading to the entire assembly having to be recycled. Although if the rib or spar has pre-formed holes, it is notionally possible to use each of those holes as successive guides for making holes in an applied skin, this is usually awkward and sometimes practically impossible for reasons of space, and inaccuracies creep in. Additionally, drilling a hole through the skin from inside does not always provide accurate alignment of the hole in the skin, so that its axis runs exactly perpendicular to the surface of the skin. This is a particular problem where the skin is varying in thickness, e.g. tapering from a thick to thin section. Working from the outside, however, i.e. working with the skin between the operator and the spar or rib means that the positions of the holes cannot be seen. Attempts to use templates to overcome this have not been successful.

SUMMARY

The present invention seeks to overcome this problem and to provide apparatus for the detection of a non-visible object, quickly and very accurately. It should be noted that the term "object" as used herein is intended to cover a very wide variety of possibilities, including, in particular, a hole.

Accordingly broadly to the present invention, there is provided a method of locating an object lying behind an opaque surface rendering the object non-visible which comprises providing in the neighbourhood of the object a variable strength magnetic field, sensing the magnetic field strength at a plurality of positions relative to the object using an array of Hall effect magnetic sensors, the array of Hall effect sensors being associated geometrically with a machining guide, such that the machining guide and the array of sensors are fixed positionally one relative to the other, interrogating the sensors to determine the value of the field strength with at least the majority of the sensors, analysing the sensor responses to determine the displacement between the object and the machining guide, and moving the array and machining guide to a position in which the displacement is a minimum.

Using such an approach, the location of the object behind the opaque surface can be rapidly and easily determined and when the displacement is a minimum, the machining guide is then located adjacent the surface at that point of the surface immediately and centrally overlying the object in question. The position of the array and machining guide can then be fixed, e.g. by locking the array on the surface, whereafter the machining guide, for example a guide tube, can then be used to guide, e.g. a drill to make a hole in the opaque surface precisely located relative to the non-visible object. Locking of the array on to the surface can occur e.g via vacuum pads.

The present invention accordingly also provides apparatus for locating non-visible objects positioned behind an opaque surface, which apparatus comprises means to generate a variable strength magnetic field, a base member adapted to be placed on or against the surface, means in the base member defining a machining guide, an array of Hall effect sensors located relative to the machining guide, and means for collecting and analysing outputs from at least some of the sensors to provide an indication of the variation of the magnetic field associated with the object relative to the position of the base member.

The base member is preferably adapted to be moved across the surface to enable the machining guide to be aligned with the object. The apparatus preferably includes fixing means adapted to lock the relative position of the base member and the object relative to one another. Preferably the means for analysing includes a visual display means adapted to indicate the location of the object relative to the array of sensors, and accordingly to indicate when the array is positioned with the machining guide associated therewith located closest to the non-visible object.

The present invention is particularly valuable in the technical area of locating holes, particularly, though not exclusively, in the technical field mentioned above, i.e. in fitting an opaque metal skin on to underlying supporting members in aircraft construction. While it is theoretically possible to detect the presence of a hole in an underlying spar or strut because the physical properties of the hole differ from that of the surrounding material defining the hole, appropriate sensors can be expensive and the usually necessary alignment and calibration of an array of them can be complex. In this particular application of the method of the present invention, however, a simple and highly effective approach is to put a magnet in the hole itself, or locate one relative to the Hall effect sensors and locate a ferromagnetic material, e.g. a soft iron disc, in the hole.

Conventional alloys used for aircraft construction are predominantly aluminium alloys which are non-ferromagnetic, so the use of a small cylindrical magnet enables very clear and defined signals to be obtained from an array of Hall effect sensors, even if the skin is thick, e.g. up to 70 mm thick. The skin may be even thicker and could be made of other materials, for instance carbon fibre composites 70 mm or more thick. The reader will appreciate that the application of the invention is not limited to such implementations and, with appropriate scaling, measurements through thicker and/or thinner layers can be achieved.

As noted above, the object to be located behind the opaque skin is a hole in the spar. However, the object may be, for example, a magnet located relative to an (unbored) spar using an appropriate jig, so that when e.g. a bore is drilled using the machining guide, it is drilled through both skin and spar, but at the desired position on the spar.

The array of sensors is customarily a symmetrical array about the machining guide. The number and positioning of the sensors in the array may be varied depending upon the degree of precision required as well as on the type of sensor. A particularly preferred approach is to use a cruciform array of sensors with a plurality of sensors located spaced along the arms of a notional cross, the machining guide then being located at the centre point of the intersection between those arms, as this needs only relatively straightforward data processing of the sensor signals. However, in appropriate circumstances, the array may be more complex, e.g. 16 sensors×16 sensors arranged in a square grid, or one or more concentric circles. The processing of the data set from the sensors may then be more complex, but the accuracy of positional detection may be greater.

Dual or tri-axis Hall effect sensors can be used to measure field direction alongside field strength, for improved accuracy.

The visual display providing an indication of the location of the object relative to the location of the array is preferably compact and easy to understand. A particularly preferred form of display is that of a computer driven flat display screen on which are represented in appropriate symbolic fashion the location of the object and the location of the machining guide. By moving the array and machining guide, the graphic representations on the screen may be made to coincide. The display screen may, for example, form part of a conventional laptop computer, or a hand-held computing device, often referred to as a PDA. In either case by combining appropriate programming and interface electronics, the signals from the individual sensors in the array may be processed using known techniques to produce the indication on screen. By appropriate programming, sophisticated features may be introduced rendering the apparatus easier to use, for example automatic re-scaling of the display as the machining guide and object approach coincidence as the array is moved. When the array is first placed on or against the opaque surface, the location of the object may be displayed relative to the location of the entire array, and as the array is moved to bring machining guide and object into close alignment, so the display may be reset automatically to concentrate only on the narrow area around the machining guide, even though the signals from the entire array may still be used as desired to calculate the relative positions of array and object.

The visual display may be dispensed with if the movement of the machining guide and array is under appropriate mechanical control rather than manual, for example if the machining guide and array are mounted at the end of a robotic arm or on an analogous movable base.

Once coincidence has been achieved by moving the array relative to the object, it is desirable to fix the two temporarily in position one relative to the other in order to allow the machining guide to be used, e.g. for acting as a positioning jig to enable a mechanical process to be carried out on the opaque surface, for example drilling a hole at the position so identified. For this purpose, the apparatus may include means for temporarily fixing the array in a position on the opaque surface, for example by attaching it via actuatable vacuum pads thereto.

The use of vacuum pads is particularly recommended in cases where the opaque surface is not horizontal, a state of affairs often encountered in the assembly of e.g. large aircraft or aircraft components. In such a case, the base carrying the array of sensors is preferably equipped with vacuum pads which can be subjected to reduced pressure at two discrete levels, one level providing a sufficient holding force to attach the base member of the array to the surface sufficiently loosely that it can still be moved around relative thereto, and a stronger holding level at which the base member holding the array of sensors is essentially firmly clamped in fixed position against the opaque surface. Vacuum fixation (or other fixing means) may also be conveniently used to locate a display unit, particularly where the display unit is PDA, on a portion of the opaque surface close to the portion under which the object is located. Operating in this way is possible rapidly to locate, e.g. holes in a spar underneath an opaque wing skin to an adequate degree of precision.

Alternatively, the application and fixation of the base member may be achieved by mounting it on a robot arm, and so arranging the control of the robot that the base member may be moved to the area of interest, sensing applied to locate the hole and the base member then moved to align it as desired, whereafter it may then be held firmly in place by the robot while other actions are effected, e.g. drilling a hole through the skin.

The accuracy of performance of apparatus as just described is clearly susceptible to deterioration on account of sensor ageing. This problem can be alleviated by providing, for use with the sensor array, some form of standard template of known responsiveness and having means to enable the base member carrying the sensor array to be accurately and repeatably coordinated to the template. Using appropriate software programming, the individual sensor responses can be interrogated when the array is positioned on the template and the actual responses compared with those which should theoretically be produced, or which have been produced using the same set-up but in the past, with the current values. The programming of the data capture and analysis software may be such as to enable automatic corrections to be applied to compensate for sensor drift or loss of sensitivity.

DESCRIPTION OF THE DRAWINGS

By way of further explanation of the invention, and by way of illustrating how it can be put into practical use, reference is made to the accompanying drawings, in which.

DETAILED DESCRIPTION

Figure 1:
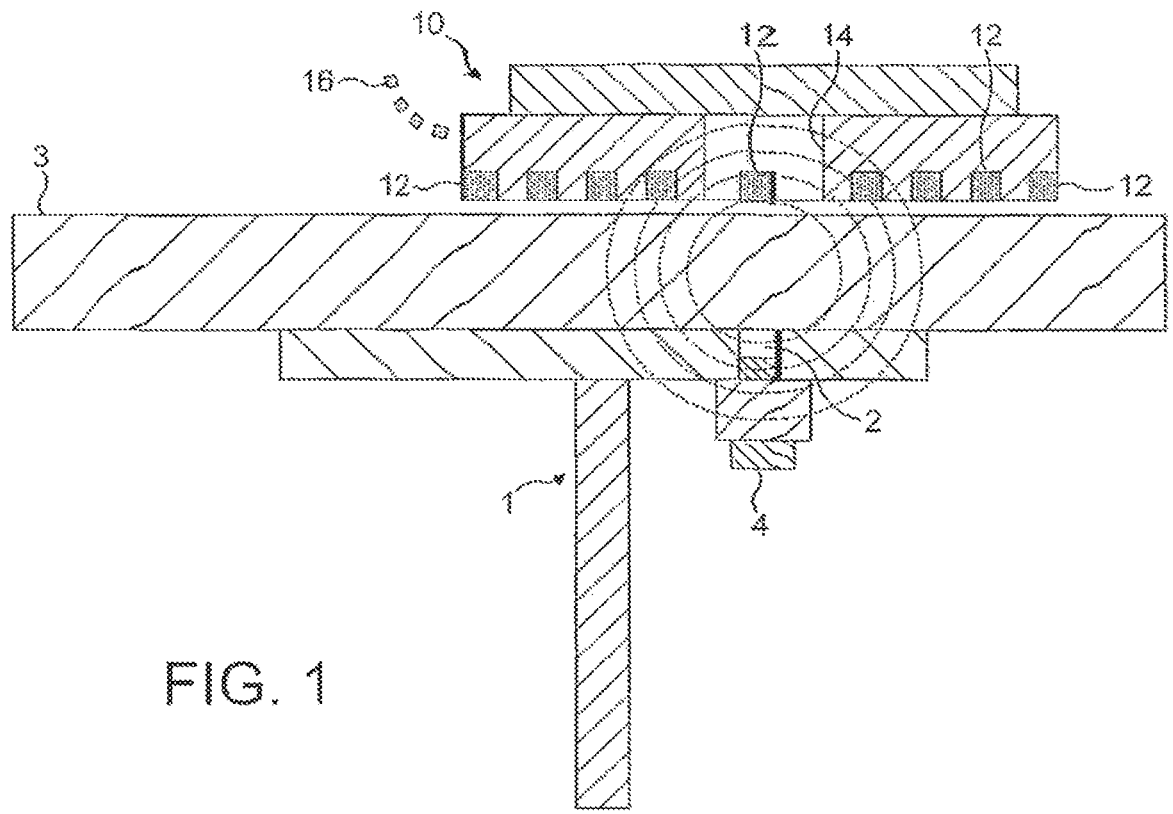
FIG. 1 is a diagrammatic illustration of a section through a sensor array in accordance with a first embodiment of the invention, the sensor array being located adjacent an opaque metallic skin in turn located adjacent a pre-drilled spar.

Referring to FIG. 1, this shows in extremely diagrammatic form, how the present invention may be applied to the detection of holes in a spar on the far side of a metal cladding sheet. For the sake of simplicity, only one hole is shown in the flat portion of a spar generally indicated at 1, the hole being denoted 2. As shown, a plate 3 (for example an alloy skin for a wing) which is to be attached to the spar is placed against it.

In order to enable detection of the position of the hole 2, a magnet assembly 4 set in a suitable mounting is located relative to the hole 2 from below as shown in FIG. 1.

Figure 7:
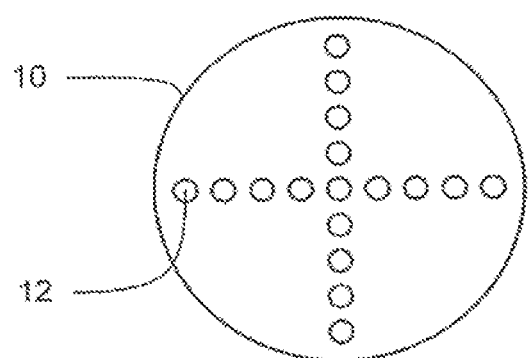
FIG. 7 is a first example of a sensor head in accordance with an embodiment of the invention.

Located on top of plate 3 as shown in FIG. 1 is a sensor array generally indicated at 10. This array consists of a base member having a generally flat undersurface in which is set a cruciform array of seventeen Hall effect sensors 12 (further illustrated in FIG. 7). As seen in the drawings, eight of the sensors 12 are seen spaced to either side of a central sensor 12. The eight are aligned in a row and the central sensor 12 is, counting from the end of the row of sensors perpendicular to the plane of the drawing, the fifth one. Reference number 14 denotes the wall of a cylindrical aperture in the middle of the array.

Figure 8:
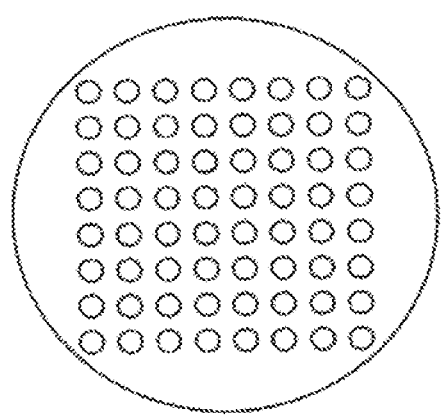
FIG. 8 is a second example of a sensor head in accordance with an embodiment of the invention.
Figure 9:
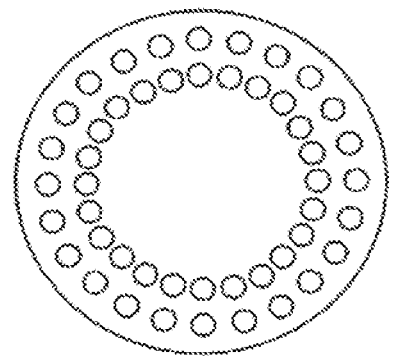
FIG. 9 is a third example of a sensor head in accordance with an embodiment of the invention.

Alternative arrangements of sensors are conceivable, and two further examples are illustrated in FIGS. 8 and 9. FIG. 8 shows an 8 by 8 array of 64 sensors (more or fewer sensors are possible) and FIG. 9 shows 48 sensors arranged in two concentric circles.

As will be appreciated, the end of the magnet assembly 4 inserted into hole 2 is the centre location of a generally symmetric magnetic field having its maximum located in terms of the upper surface of plate 3 at the point on that upper surface which is precisely aligned with the axis of hole 2. At points on the upper surface of plate 3 more remote from that point, the magnetic field strength is less. The magnetic field strength at any point on the surface can be measured using a 1-all effect sensor.

The reader will appreciate that any other magnetic field strength sensor could be used, such as an eddy current based sensor.

The Hall effect sensors 12 are connected via a suitable signal-carrying cable 16 to an evaluation electronics, for example in the form of a laptop computer or PDA.

It will readily be appreciated that if the array 10 is located as shown in FIG. 1 with the hole 14 located coaxially with the hole 2, then the magnetic field strength will be greatest and of equal value at the positions of the Hall sensors radially closest to aperture 14, with the field strength detected by each of the sensors more remote from aperture 14 being less, and being lowest at the outermost ones.

If the array 10 is shifted from its position in FIG. 1, the field strengths will vary at the individual sensors 12 and the signals from them can be appropriately analysed to work out how far the axis of aperture 14 then deviates from the axis of hole 2. By moving assembly 10 to minimise that deviation, the aperture 14 may be aligned with hole 2 essentially seen from above as shown in FIG. 1. Aperture 14 may then, for example, have a drilling guide inserted into it, or, for example, a marking implement of some type so as to identify that point on the upper surface of plate 3 which lies on the axis of hole 2.

Figure 2:
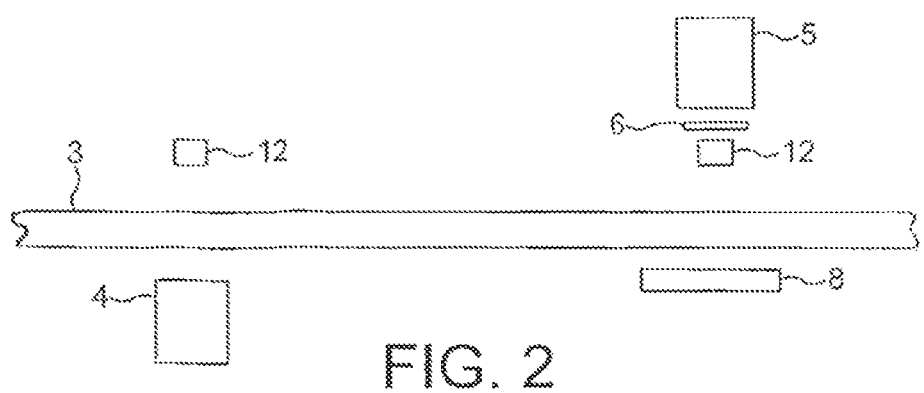
FIG. 2 is a diagram showing two alternative approaches to providing the variable strength magnetic field.

FIG. 2 shows diagrammatically two different ways of operating the system Each can be used depending on the particular task involved.

The system shown on the left of the drawing corresponds to the operation as illustrated in FIG. 1, with a magnet 4 one side of an opaque sheet 3, for example an aluminium alloy skin for an aircraft wing, and the Hall effect sensor 12 located on the other.

However, the system may also be operated the "other way round", as shown on the right of FIG. 2. In that alternative, a magnet 5 can be located behind the Hall effect sensor 12, with a ferromagnetic diffuser plate 6 located between them. The magnetic field below Hall effect sensor 12 as seen in the drawing is affected by a ferromagnetic "target" piece 8 located the other side of skin 3. This may be a piece of ferromagnetic material such as soft iron or, for example, a disk or slug of moulded plastics material loaded with iron powder or filings. This latter approach is of particular value in locating holes so that a bore concentric therewith may be drilled from above as seen in FIG. 2. Each hole in e.g. an aircraft wing spar, may have such a plastics slug fitted into it, and these then drop out or are drilled out each time a bore is made through the opaque sheet of material following the location of the hole and fixation of the base member carrying the Hall effect sensor array, the machining guide, and, in this case, the magnets 5.

Figure 3:
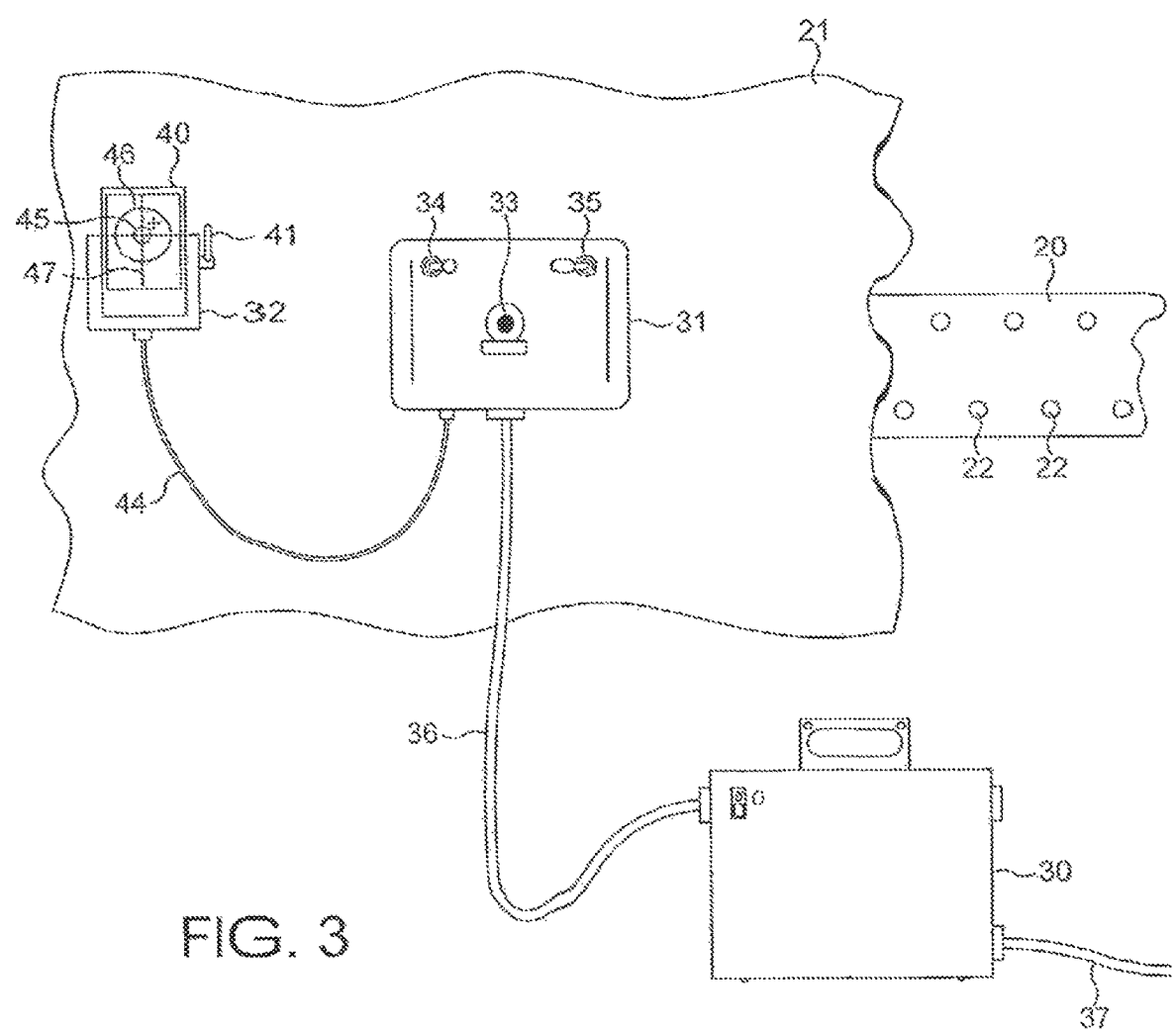
FIG. 3 is a diagrammatic perspective view showing apparatus in accordance with the first embodiment of the invention in use.

Referring now to FIG. 3, this is a diagrammatic illustration of apparatus in accordance with the invention which is to be used to locate holes 22 in a pre-drilled aircraft wing spar 20 when it is located behind an aluminium skin 21 which is to be fixed to spar 20 by means of rivets. Each rivet needs to pass through a hole made in skin 21 and through one of the pre-drilled holes 22 in spar 20.

The apparatus consists basically of a main pneumatics and power supply equipment box 30, a movable drilling guide 31 which, as can be seen, is held against the skin 21, and which contains the electronics described below and a display unit at a housing 32. Box 30 has a suitable power supply lead 37 for connecting to a source of electrical power.

On the underside of the unit 31 and accordingly not visible in FIG. 2, is an array of Hall effect sensors. These surround a drilling guide tube 33 in an appropriate arrangement, for example cruciform, though other arrangements can be contemplated.

Unit 31 also carries two vacuum line switches 34 and 35 which can be actuated by the user of the system to hold unit 31 very firmly against skin 21, i.e. in fixed position relative thereto, and which can be adjusted to release the vacuum slightly so that unit 31 can be moved around on skin 21. Umbilical lead 36 provides air and power to unit 31 from box 30.

Before using the apparatus, to locate one of the holes 22 not visible behind skin 21, a magnet is placed in one of the holes 22 so that a symmetrical magnetic field spreads out through the skin 21 and its field strength can be detected adjacent the surface of skin 21 visible in FIG. 2 by means of the Hall effect sensors on the underside of unit 31. Those sensors are connected to processing electronics located in unit 31.

By appropriate processing of the signals received from the individual Hall effect sensors in the array on the underside of unit 31, the location of the maximum magnetic field strength point can be found and, more particularly, displayed on a simple screen display 40 set in housing 32. Display 40 can be a PDA and housing 32 a docking station. Housing 32 may be affixed by means of a suction cup to the visible side of skin 21 at any convenient point. Fixture is effected by a suction cup actuation lever 41 on housing 32 and the display 40 is connected via a signal cable 44 with the electronics in unit 31. As can be seen on display 40, the display consists of a pair of concentric circles 45, 46 and a (fixed) vertical and horizontal crossbar structure 47. The electronics are arranged to show on the screen the position of the point of maximum magnetic field strength. The crossbar structure 47 is positioned such that it corresponds to the drilling aperture 33, i.e. as unit 31 is moved, so concentric circles 45 and 46 on the display move likewise. It is accordingly very straightforward, with unit 32 stationary but unit 31 being movable, to move unit 31 into a position where the smaller circle 45 is precisely central relative to the crossbar structure 47. The positioning is easy and intuitive and analogous to aligning the target with the crosshairs in a telescopic rifle sight.

Once this coincidence has been achieved, unit 31 may then be clamped firmly in position on skin 21 and aperture 33 used as a drilling guide enabling a bore to be made in skin 21 which is precisely perpendicular to the surface of skin 21 and which is precisely coincident with the bore 22 in spar 20 which carried the magnet during the positioning process. The bore may accordingly be made, unit 31 taken out of the way, a rivet inserted and fixed in position, and the process then repeated for the purpose of drilling the next hole in skin 21 to align with the next aperture 22 in the rib.

Figure 4:
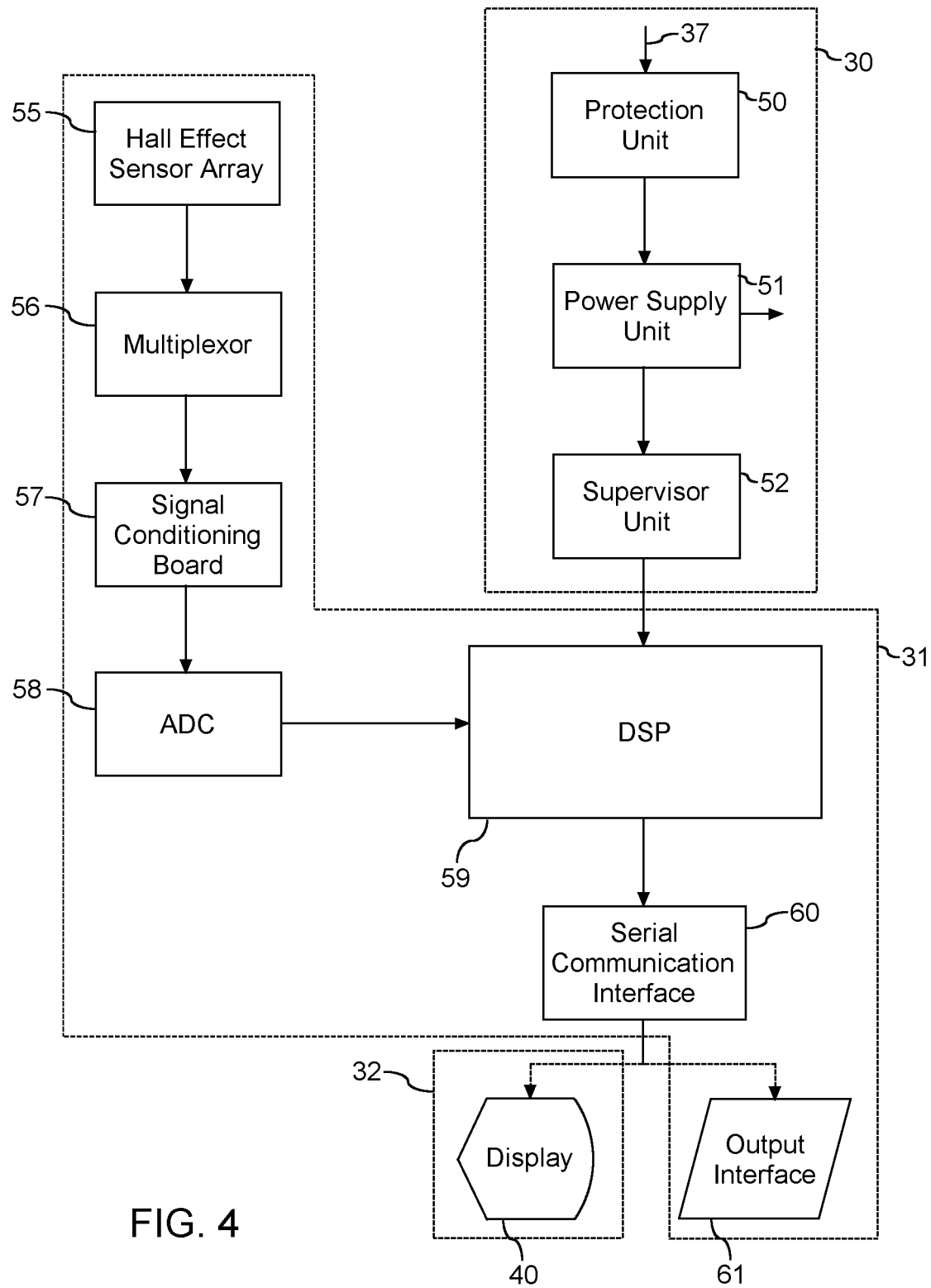
FIG. 4 is a block diagram showing the electronics arrangements in the apparatus of the first embodiment.

FIG. 4 shows a basic diagram of the electronics used in the apparatus shown in FIG. 3.

The dashed boxes in FIG. 4 indicate which parts of the system are housed in unit 31, which on housing 32 and which are housed in box 30. An input voltage supply fed via lead 37 is fed via a suitable protection unit against overvoltage and over-current to a power supply unit 50. The protection unit 50 protects the power supply denoted 51 from any transients and reverse polarity problems. The power supply unit 51 is basically designed to generate stable analogue digital power supplies for use with the Hall effect sensor array in unit 31 and to provide a system voltage for powering the digital processing electronics itself.

Located on the output side of power supply unit 51 is a power supply supervisor unit 62 which is used to monitor the sensor voltage supply and to indicate, for example by flashing up a message on display 40, if there is a problem.

Turning now to the Hall effect sensor array, this is denoted 55 in FIG. 4 and the outputs of the individual sensors in the array are fed to a multiplexer 56 and signal conditioning board 57 which is provided with the necessary electronics to clean and stabilise the Hall effect sensor voltage measured. The signal corresponding to the cottage selected by multiplexer 56 is fed to a high resolution analogue/digital converter 58 to provide a digital signal corresponding to the Hall effect sensor voltage and this is fed in turn into a digital signal processing unit 59 which stores and processes the digital voltage signals corresponding to each of the Hall effect sensors in turn. By appropriate programming, this can then calculate the position of the centre of the magnetic field relative to the array itself and it can provide that information via a serial communication interface 60 to the display 40 located on housing 32. As noted with respect to FIG. 3, this graphical display presents the position of the sensor array relative to the magnet in a very easily comprehendible fashion.

The electronics also has an output interface 61 which can be used to control any external apparatus, for example a monitoring computer or a robot control computer.

Figure 5:
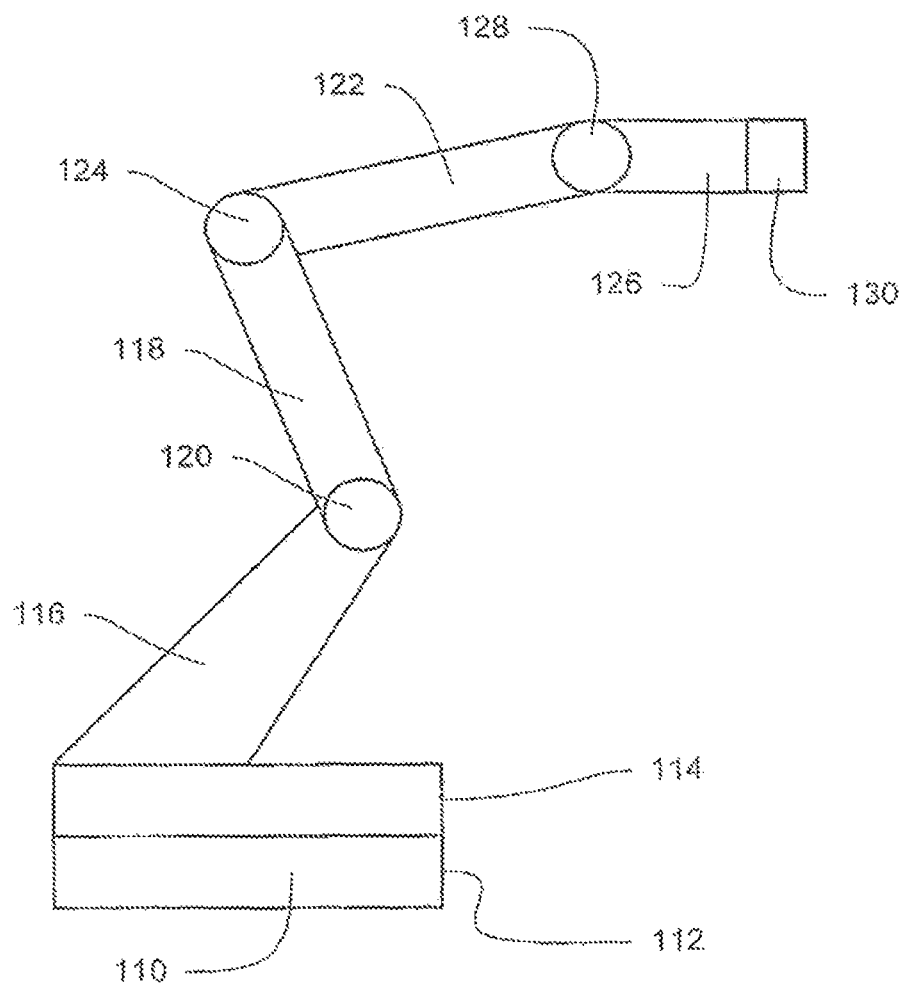
FIG. 5 is a diagram of apparatus in accordance with a second embodiment of the invention, comprising a robot arm and associated sensor and machining heads.

In that context, a second embodiment of the invention is now described with reference to FIGS. 5 and 6. As illustrated in FIG. 5, an industrial robot 100 comprises a base 110 having a static portion 112 fixed in use to a floor or the like, and a rotatable portion 114 operable to rotate above the static portion 112, under the direction of suitable drive means about a vertical axis, in the fashion of a turntable. A base arm 116 extends from the rotatable portion 114, at the distal end of which a first arm 118 is hingeably connected using an elbow hinge 120 set with a horizontal axis. A second arm 122 is then hingeably connected to the distal end of the first arm 118 with a further elbow hinge 124.

A head 126 is then connected to the distal end of the second arm 122 with a ball joint 128. The head 126 has a magazine 130 in which is incorporated a sensor array as previously described, and which will be further described in due course with reference to FIG. 6.

Each of the elbow hinges 120, 124 and the ball joint 128, are under the control of suitable drive means as will be understood by the reader familiar with robotics. In particular, the robot 100 will be under computer control, and the motion will be imparted by suitable stepping motors or the like, with positional control sufficient to ensure the accurate positioning of the head 126. Detailed description of such features is not essential to the understanding of this embodiment of the invention.

Figure 6:
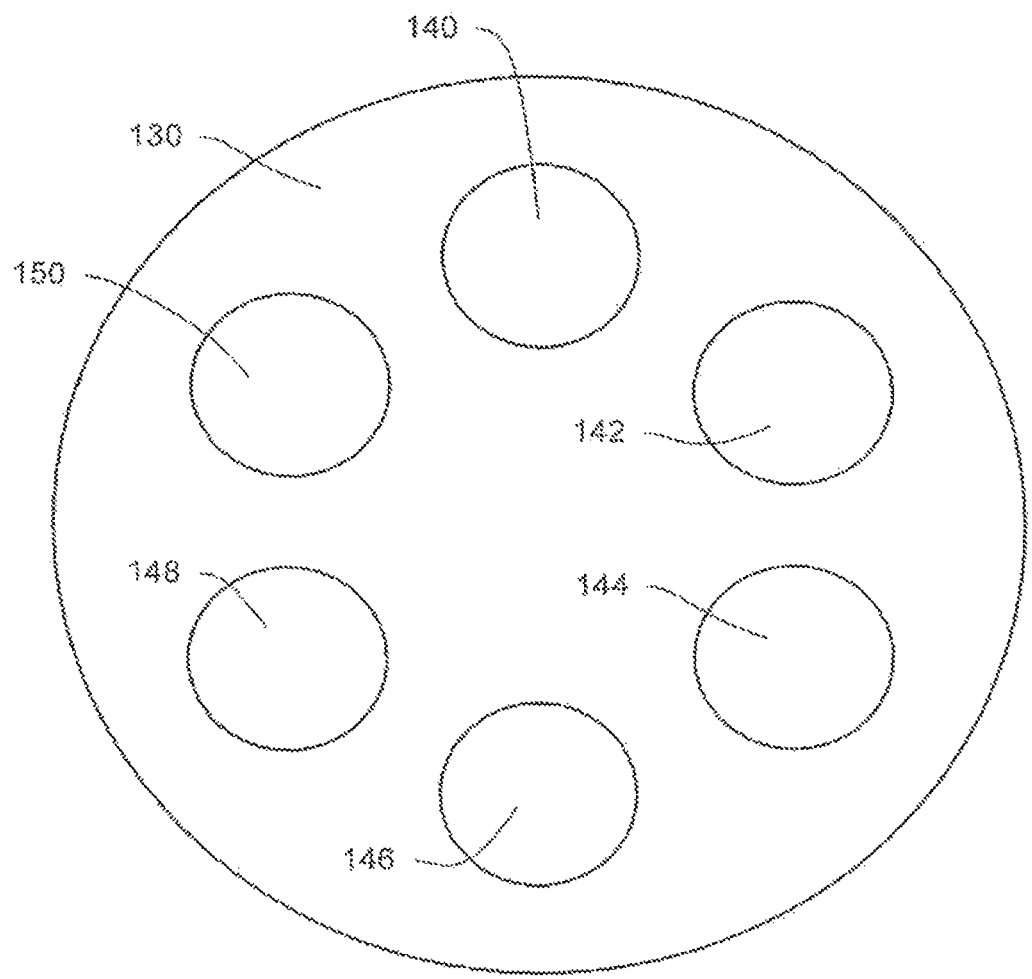
FIG. 6 is a diagram of the head of the robot arm illustrated in FIG. 5.

The magazine 130 is illustrated in further detail in FIG. 6. The magazine 130 is generally illustrated as being cylindrical, and is shown in end elevation in FIG. 6.

Six head units are illustrated, which are spaced equiangularly about a central axis of the magazine. The heads comprise: a sensor array 140; a drill 142; a countersink drill 144, a polisher 146; a sealant dispenser 148; and a riveting tool 150.

The magazine 130 is rotatable about its own cylindrical axis (by drive means again not illustrated for reasons of clarity), to allow presentation of each of the six units in turn by rotation of the magazine through increments of 60 degrees. The robot head is thus able to perform each of the six operations involved in inserting a rivet in a designated point in a mechanical component, the point being indicated by way of a magnetic field generating object as previously described, or on the basis of detection of a hole in an object behind the skin to be drilled, with the magnetic field to achieve this being generated behind the sensor array in such a circumstance.

Thus, in this embodiment, the drilling axis is not coincident with the sensor array. In this embodiment, the drilling axis (and indeed the countersinking axis) is displaced away from the sensor array, but by a fixed amount by virtue of the fixed relationship between the sensor array 140 and the drill 142.

It will be appreciated that this is but one example of a factory automation arm, or machine, which could serve to implement an embodiment of the present invention. A linear arrangement, including a linearly displaceable magazine, could also be provided. A gantry style robot could be used instead of an "arm" style machine. The level of artificial intelligence provided in such a robot is not an essential part of the present invention, as control electronics for the sensor, and thus for the magazine as a whole, should be in line with the electronics illustrated in FIG. 4 (with modification as appropriate to the implementation chosen by the designer).

The following clauses are provided as further descriptions of example embodiments.

Clause 1—a method of locating an object that is lying behind an opaque surface, the method comprising: providing in the neighbourhood of the object a variable strength magnetic field; using an array of Hall effect magnetic sensors for sensing the magnetic field strength of the provided magnetic field at a plurality of positions relative to the object, the array of Hall effect sensors being associated geometrically with a machining guide, such that the machining guide and the array of sensors are fixed positionally one relative to the other; interrogating at least a majority of the sensors in the array to determine a value of the field strength; receiving sensor responses from the interrogated sensors, and analyzing the received sensor responses to determine the displacement between the object and the machining guide; and moving the array to a position at which the determined displacement is at a minimum, wherein so moving the array correspondingly moves the machining guide that is fixed positionally relative to the array, and wherein so moving the array also locates the machining guide immediately and centrally over a point on the opaque surface that is opposite the object lying behind.

Clause 2—the method according to clause 1, wherein once the machining guide is located adjacent the surface at that point of the surface immediately and centrally overlying the object in question, the position of the array and machining guide is fixed.

Clause 3—the method according to clause 2, wherein the fixation is effected by locking the array on to the surface via vacuum pads.

Clause 4—the method according to clause 1, wherein the object is a hole relative to which a magnet or body of ferromagnetic material is located.

Clause 5—an apparatus for locating non-visible objects positioned behind an opaque surface, which apparatus comprises: means to generate a variable strength magnetic field; a base member adapted to be placed on or against the surface; means in the base member defining a machining guide; an array of H-all effect sensors located relative to the machining guide, and means for collecting and analysing outputs from at least some of the sensors to provide an indication of the variation of the magnetic field associated with the object relative to the position of the base member.

Clause 6—the apparatus according to clause 5, wherein the base member is adapted to be moved across the surface to enable the machining guide to be aligned with the object.

Clause 7—the apparatus according to clause 5, and including fixing means adapted to lock the position of the base member and the object relative to one another.

Clause 8—the apparatus according to clause 5, and wherein the means for analysing includes a visual display means adapted to indicate the location of the object relative to the array of sensors, and accordingly to indicate when the array is positioned with the machining guide associated therewith located closest to the non-visible object.

Clause 9—the apparatus according to clause 5, wherein the array of Hall effect sensors is a cruciform array.

Clause 10—the apparatus according to clause 8, wherein the visual display is a computer-driven flat display screen adapted to represent in appropriate symbolic fashion the location of the object and the location of the machining guide.

Clause 11—a method of locating an object lying behind an opaque surface rendering the object non-visible, which comprises: providing in the neighbourhood of the object a variable strength magnetic field; sensing the magnetic field strength at a plurality of positions relative to the object using an array of magnetic field strength sensors, the array of magnetic field strength sensors being associated geometrically with a machining guide, such that the machining guide and the array of sensors are fixed positionally one relative to the other; interrogating the sensors to determine the value of the field strength with at least the majority of the sensors; analysing the sensor responses to determine the displacement between the object and the machining guide, and moving the array and machining guide by means of non-manual mechanical control to a position in which the displacement is a minimum.

Clause 12—the method according to clause 11, wherein once the machining guide is located adjacent the surface at that point of the surface immediately and centrally overlying the object in question, the position of the array and machining guide is fixed.

Clause 13—the method according to clause 11, wherein the object is a hole relative to which a magnet or body of ferromagnetic material is located.

Clause 14—an apparatus for locating a non-visible object positioned behind an opaque surface, which apparatus comprises: means to generate a variable strength magnetic field; a base member adapted to be placed on or against the surface; means in the base member defining a machining guide; an array of magnetic field strength sensors located relative to the machining guide; means for collecting and analysing outputs from at least some of the sensors to provide an indication of the variation of the magnetic field associated with the object relative to the position of the base member; and means for mechanically controlling movement of the array and machining guide operable, in use, to control movement in response to analysed sensor signals.

Clause 15—the apparatus for locating a non-visible object positioned behind an opaque surface, such an object being in use operable to generate a magnetic field variable with physical location, the apparatus comprising: a base member adapted to be placed on or against the surface; means in the base member defining a machining guide; an array of magnetic field strength sensors located relative to the machining guide; means for collecting and analysing outputs from at least some of the sensors to provide an indication of the variation of the magnetic field associated with the object relative to the position of the base member; and means for mechanically controlling movement of the array and machining guide operable, in use, to control movement in response to analysed sensor signals.

Clause 16—the apparatus according to clause 14, wherein the means for mechanically controlling movement is a robot arm.

Clause 17—the apparatus according to clause 14, wherein the means for mechanically controlling movement is operable to move the array and machining guide to a position located adjacent to the non-visible object.

Clause 18—the apparatus according to clause 14, wherein the base member is adapted to be moved across the surface to enable the machining guide to be aligned with the object.

Clause 19—the apparatus according to clause 14, and including fixing means adapted to lock the position of the base member and the object relative to one another.

Clause 20—the apparatus according to clause 14, wherein the array of magnetic field strength sensors is a cruciform array.

Clause 21—a method of locating an object lying behind an opaque surface rendering the object non-visible, which comprises: providing in the neighbourhood of the object a variable strength magnetic field; sensing the magnetic field strength at a plurality of positions relative to the object using an array of magnetic field sensors, the array of magnetic field sensors being associated geometrically with a machining guide, such that the machining guide and the array of sensors are fixed positionally one relative to the other, interrogating the sensors to determine the value of the field strength with at least the majority of the sensors; analysing the sensor responses to determine the displacement between the object and the machining guide; and moving the array and machining guide to a position in which the displacement is a minimum.

Clause 22—the method in accordance with clause 21, wherein the magnetic field sensors are operable to measure field direction and including interrogating the sensors to determine the field direction with at least the majority of the sensors.

Clause 23—an apparatus for locating non-visible objects positioned behind an opaque surface, which apparatus comprises: means to generate a variable strength magnetic field; a base member adapted to be placed on or against the surface; means in the base member defining a machining guide; an array of magnetic field sensors located relative to the machining guide; and means for collecting and analysing outputs from at least some of the sensors to provide an indication of the variation of the magnetic field associated with the object relative to the position of the base member.

Clause 24—the apparatus in accordance with clause 23, wherein the magnetic field sensors are operable to measure field strength and direction.

Clause 25—the apparatus in accordance with clause 24, wherein the magnetic field sensors are Hall effect sensors.

Clause 26—the apparatus in accordance with clause 24, wherein the magnetic field sensors are operable to measure field strength in two substantially orthogonal axes, to determine a measure of field direction resolved into a plane.

Clause 27—the apparatus in accordance with clause 24, wherein the magnetic field sensors are operable to measure field strength in three substantially orthogonal axes, to determine a measure of field direction.

Clause 28—a method of locating an object lying behind an opaque surface rendering the object non-visible, which comprises: providing in the neighbourhood of the object a variable strength magnetic field; sensing the magnetic field strength at a plurality of positions relative to the object using an array of magnetic field strength sensors, the array of magnetic field strength sensors being associated geometrically with a machining guide, such that the machining guide and the array of sensors are fixed positionally one relative to the other; interrogating the sensors to determine the value of the field strength with at least the majority of the sensors; analysing the sensor responses to determine the displacement between the object and the machining guide; and moving the array and machining guide by means of non-manual mechanical control to a position in which the displacement is a minimum.

Clause 29—an apparatus for locating a non-visible object positioned behind an opaque surface, which apparatus comprises: means to generate a variable strength magnetic field; a base member adapted to be placed on or against the surface; means in the base member defining a machining guide; an array of magnetic field strength sensors located relative to the machining guide; means for collecting and analysing outputs from at least some of the sensors to provide an indication of the variation of the magnetic field associated with the object relative to the position of the base member, and means for mechanically controlling movement of the array and machining guide operable, in use, to control movement in response to analysed sensor signals.

Clause 30—an apparatus for locating a non-visible object positioned behind an opaque surface, such an object being in use operable to generate a magnetic field variable with physical location, the apparatus comprising a base member adapted to be placed on or against the surface, means in the base member defining a machining guide, an array of magnetic field strength sensors located relative to the machining guide, means for collecting and analysing outputs from at least some of the sensors to provide an indication of the variation of the magnetic field associated with the object relative to the position of the base member, and means for mechanically controlling movement of the array and machining guide operable, in use, to control movement in response to analysed sensor signals.

What is claimed is:

1. An apparatus for locating a non-visible object, the non-visible object operable to generate a magnetic field, the apparatus comprising:
    a base member;
    a machining guide;
    a plurality of magnetic field strength sensors, wherein the plurality of magnetic field strength sensors and the machining guide are movable together while each of the plurality of magnetic field strength sensors are fixed positionally relative to the machining guide, wherein the plurality of magnetic field strength sensors are arranged in first and second concentric circles; and
    a visual indicator operable to present information indicative of a displacement between the non-visible object and the machining guide;
    wherein each of a first subset plurality of the plurality of magnetic field strength sensors, in the first of the concentric circles, are positioned a first distance from the machining guide, wherein each of a second subset plurality of the plurality of magnetic field strength sensors, in the second of the concentric circles, are positioned a second distance from the machining guide that is greater than the first distance.

2. The apparatus of claim 1, further comprising a vacuum pad to lock the position of the base member on a surface.

3. The apparatus of claim 1, wherein the plurality of magnetic field strength sensors comprise Hall effect sensors.

4. The apparatus of claim 1, wherein the plurality of magnetic field strength sensors are arranged in a symmetrical array about the machining guide.

5. The apparatus of claim 1, wherein the machining guide is a drilling guide to provide a bore on a surface.

6. The apparatus of claim 1, further comprising a robot configured to control movement of machining guide.

7. The apparatus of claim 6, wherein the robot comprises a movable base.

8. The apparatus of claim 1, further comprising a robot arm configured to move the machining guide to a position located adjacent to the non-visible object.

9. An apparatus for locating a non-visible object, the non-visible object operable to generate a magnetic field, the apparatus comprising:
    a base member;
    a machining guide;
    a plurality of magnetic field strength sensors, wherein the plurality of magnetic field strength sensors and the machining guide are movable together while each of the plurality of magnetic field strength sensors are fixed positionally relative to the machine guide, wherein the plurality of magnetic field strength sensors are arranged in first and second concentric circles;
    a robot configured to control movement of the plurality of magnetic field strength sensors and machining guide based on measurements from the plurality of magnetic field strength sensors;
    wherein each of a first subset plurality of the plurality of magnetic field strength sensors, in the first of the concentric circles, are positioned a first distance from the machining guide,
    wherein each of a second subset plurality of the plurality of magnetic field strength sensors, in the second of the concentric circles, are positioned a second distance from the machining guide that is greater than the first distance.

10. The apparatus of claim 9, wherein the robot comprises a movable base.

11. The apparatus of claim 9, further comprising a vacuum pad to lock the position of the base member and the object relative to one another.

12. The apparatus of claim 9, wherein the plurality of magnetic field strength sensors comprise Hall effect sensors.

13. The apparatus of claim 9, wherein the plurality of magnetic field strength sensors are arranged in a symmetrical array about the machining guide.

14. The apparatus of claim 9, wherein the machining guide is a drilling guide to provide a bore on a surface.

* * * * *

UNITED STATES PATENT AND TRADEMARK OFFICE
CERTIFICATE OF CORRECTION

| | | |
|---|---|---|
| PATENT NO. | : 11,448,793 B2 | Page 1 of 1 |
| APPLICATION NO. | : 16/446761 | |
| DATED | : September 20, 2022 | |
| INVENTOR(S) | : Richard David Hughes | |

It is certified that error appears in the above-identified patent and that said Letters Patent is hereby corrected as shown below:

On the Title Page

Item (60), please add:
Application Number PCT/GB2003/003624, filed on August 19, 2003.

Signed and Sealed this
Eleventh Day of March, 2025

Coke Morgan Stewart
*Acting Director of the United States Patent and Trademark Office*